United States Patent Office 3,388,068
Patented June 11, 1968

3,388,068
NONSQUAWKING AUTOMATIC
TRANSMISSION FLUIDS
Thomas D. Newingham, Broomall, Pa., assignor to Sun
Oil Company, Philadelphia, Pa., a corporation of New
Jersey
No Drawing. Filed May 5, 1964, Ser. No. 365,162
5 Claims. (Cl. 252—75)

In one embodiment this invention is a novel nonsquawking automatic transmission fluid, the nonsquawking characteristic of the fluid being due to the incorporation therein of a certain type of additive. Besides rendering the fluid nonsquawking the additive also improves in some cases certain other properties of the fluid. The invention also embraces the lubrication of an automatic transmission with the novel transmission fluids of the invention and, in a further embodiment, an apparatus which comprises an automatic transmission and the novel transmission fluid, each contained within a housing.

The antisquawk additive present in the transmission fluid of the invention is a compound selected from the group consisting of carboxylic acids having the formula

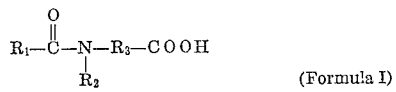

(Formula I)

and alkali and alkaline earth metal salts thereof. In the formula $R_1$ is a straight chain alkyl or alkenyl group, preferably an alkenyl group, containing 8–30, preferably 12–25, carbon atoms, $R_2$ is hydrogen or an alkyl group containing 1–6 carbon atoms, and $R_3$ is an alkylene group containing 1–6 carbon atoms. Preferably $R_3$ is methylene and $R_2$ is methyl in which case the additive depicted by the above formula is an N-acyl sarcosine. The preferred antisquawk additives are the alkali (Na, K, Li, Rb, and Cs) and alkaline earth metals (Ca, Ba, Sr, Mg, Zn, Cd) of acids shown by Formula I above, the preferred metals being the alkaline earth metals, particularly calcium and barium. The salt can be either the mono- or di-salt. Compounds defined by Formula I and metal salts of such compounds are articles of commerce but can be synthesized by known methods. For example, N-acyl sarcosines are prepared by condensing a carboxylic acid chlorine with N-methylglycine. The metal salts of the acids shown in Formula I can be prepared by standard techniques, e.g., by treatment of the acid with NaOH followed by, in case an alkaline earth metal salt is desired, a double decomposition reaction with an alkaline earth metal salt such as calcium chloride.

As described the invention relates in one aspect to an additive for preventing squawk in an automattc transmission fluid. Automatic transmissions and transmission fluids therefor have been known and used in motor vehicles for a number of years. An illustration of a typical automatic transmission is shown in Clutch Surface Temperature Measurements in a Controlled-Coupling Automatic Transmission by M. L. Haviland, G. M. Research Laboratories, SAE Preprint 605B, page 2, FIG. 2, presented at Philadelphia, Pa., Oct. 29–Nov. 2, 1962. Squawk in an automatic transmission is a high pitch sound which is produced by improper engagement of the clutch plates. The clutch plates should engage smoothly with the motion of the clutch plates being continuous throughout the entire engagement period. In some cases, however, depending upon the friction characteristics of the transmission fluid, continuous motion is not obtained. Rather, one clutch plate momentarily stops, then slips for a very short time and then finally returns to continuous motion. This may happen several times during the engagement. Squawk is the sound produced as a result of this discontinuous motion. It has also been described as a "stick-slip" phenomenon by those skilled in the art. See, for example, Zuidema, The Performance of Lubricating Oils, page 4, Reinhold Publ. Co., 2nd ed. (1959). Since squawk is due to the discontinuous motion of the clutch plates during the engagement thereof, it is technically correct to refer only to the clutch plates as squawking, i.e., the transmission fluid itself does not squawk. It is conventional, however, to refer to the fluid as squawking or nonsquawking this usage probably being because of the fact that even though the fluid itself does not squawk, it is the friction properties of the fluid which determine whether or not the clutch plates will squawk.

Each embodiment of the invention includes a composition which is normally adapted for use as an automatic transmission fluid except that it has the characteristic of squawking in such use. Such a composition has added thereto, in each embodiment of the invention, a squawk-inhibiting amount of the additive described above. The composition normally adapted for use as a transmission fluid but having a squawking characteristic will be mainly an oil, either a hydrocarbon oil obtained from petroleum, i.e., a mineral oil, or a synthetic oil. In addition, the composition will have certain other properties such as viscosity, foaming, flash point, etc. characteristics which render it normally adapted for use as an automatic transmission fluid. These other properties which render an oil adapted for use as an automatic transmission fluid are well known to those skilled in the transmission fluid art and, in addition, distinguish automatic transmission fluids from oils generally. In other words, one skilled in the art has no difficulty in recognizing a particular oil as being either adapted or not adapted for use as a transmission fluid. Thus the present invention does not reside in the nature of the squawking transmission fluid. It resides in the elimination of the squawking.

Compositions normally adapted for use as a transmission fluid will contain a major amount, i.e., over 50%, of oil and a minor amount, i.e., less than 50%, of additives. Usually the amount of oil will be 75–98% and the amount of additives will be 2–25%. The additives are necessary because no oil alone has all the viscosity, flash point, foaming, etc. properties usually desired in a transmission fluid; to achieve these properties the oil must be fortified with various additives. Usually a plurality of additives are used, each specific additive being designed to improve one specific property of the hydrocarbon oil. Typical additives which are conventionally incorporated into hydrocarbon oils in order to render the latter adapted for use as automatic transmission fluids are described below in conjunction with a description of certain tests which will usually be passed by a hydrocarbon oil qualifying as a composition adapted for use as an automatic transmission fluid. These tests are an attempt by the automotive industry to set forth the properties which a composition should usually have if it is to satisfactorily serve as an automatic transmission fluid.

The oil in the composition adapted for use as an automatic transmission fluid will usually be, and preferably is, a mineral oil. However, synthetic oils such as ester oils, silicone oils, etc. can also be used. Preferred synthetic oils are the ester oils which are reaction products of dibasic acids containing 6–12 carbon atoms, e.g., sebacic, azelaic, and phthalic acids, and alcohols containing 6–12 carbon atoms, e.g., hexyl and octyl alcohols. The acid and alcohol are usually selected so that the ester, i.e., the reaction product, has a molecular weight of 300–600.

A composition adapted for use as an automatic transmission fluid will normally have a viscosity of at least 49.0 S.U.S. at 210° F. Moreover, since the viscosity must remain substantially constant during use of the fluid, it will usually have a viscosity of at least 46.5 S.U.S. after the cycling test described hereafter. The cycling test is a severe use test designed to evaluate in a short period of time the performance of the fluid in actual use over a long period of time. The final viscosity characteristic is a viscosity at −10° F. of not more than 4500 cp. as determined on a Brookfield viscosimeter. Additives commonly used to improve the viscosity properties of the oil are methacrylate ester polymers such as the products sold by Rohm & Haas under the trade name Acryloid 150 and Acryloid 710, which products are described in more detail in U.S. Patent 3,017,361.

Another characteristic of the composition is that it will usually have a flash point of at least 320° F., as determined by A.S.T.M. D–92.

The composition will normally meet certain specifications when subjected to the foam test defined by A.S.T.M. D–892. This test has 3 parts or sequences. In sequence 1 air is blown at a certain rate through a certain volume of fluid maintained at 75° F. in a specified type of graduated cylinder. After 5 minutes air flow the air is shut off and the volume of foam is measured. This is the initial volume of foam. The foam is then allowed to settle for 10 minutes after which the volume of foam is again measured. This is the volume of foam after settling. A composition adapted for transmission fluid use will normally exhibit not more than 30 mls. initial foam and 0 ml. of foam after settling. The second sequence employs a new sample of fluid and is the same as the first sequence except that the fluid is held at 200° F. rather than 75° F. The initial volume of foam should not exceed 200 mls. and, as in sequence 1, the volume of foam after settling should be zero. The third sequence is the same as sequence 1 except for the sample of fluid used. Sequence 3 employs the sample of fluid used in sequence 2. If there is any foam remaining after the 10 minutes settling period in sequence 2 the sample is stirred to collapse the foam before proceeding with sequence 3. In sequence 3 the initial volume of foam should not exceed 30 mls. and there should be no foam after settling. The additives most frequency used to reduce the foaming tendencies of oils are the silicone polymers, e.g., dimethyl silicone.

A composition normally adapted for transmission fluid use will usually be free of black flake when subjected to the copper strip test described in A.S.T.M. D–130. This test involves placing a copper strip in contact with the fluid in a closed container and then holding the fluid at 300° F. for 3 hours. At the end of the 3 hours the fluid is examined for the presence of black flake.

The composition will pass the rust protection test described in A.S.T.M. D–665, Procedure A. In this test a cylindrical steel rod is immersed in a mixture of distilled water and the fluid. The mixture is held at 140° F. for 24 hours and is agitated throughout the entire 24 hour period. At the end of the 24 hours the rod is removed and examined for rust. The test is then repeated using a new sample of fluid and a new rod. If rust is formed in both tests the fluid fails; if no rust is formed in both tests the fluid passes. The procedure to be followed in the event rust is formed in one test but not in the other is outlined in the test description. A widely used rust inhibitor is barium dialkyl dithiophosphate.

The composition will pass the Powerglide Oxidation and Thermal Stability Test. This step involves driving, by an auxiliary motor, a 1955, 1956, or 1957 Powerglide automatic transmission at a transmission shaft speed of 2150±50 r.p.m. for 300 hours. The transmission fluid employed is, of course, the fluid being evaluated and it is maintained at 275° F. (sump temperature) during the test. No air is intentionally bled into the transmission fluid during the test. At the end of the 300 hours the oil pan is removed and the transmission parts thereby exposed are examined for varnish. Next the transmission is dismantled and 4 parts (outer surface of converter, valve body outer surfaces, steel clutch plates, and screen) are examined for varnish. Five parts (converter housing sludge ring, valve body cavities, clutch pistons, clutch cylinders, and screen) are examined for sludge. Thus 5 parts are examined for sludge and 5 parts for varnish. Each part is rated on a scale from 0 to 10 by comparing its appearance with a "CRC Deposit Rating Scale" dated January 1955 and available from General Motors Corp. A 10 rating denotes a part free of any deposits. The ten individual ratings are then added to give the test score and the transmission fluid passes the test if the score is 80 or higher. A commonly used oxidation inhibitor is 2,6-di-tert-butylphenol.

The composition will also pass the Transmission Cycling Test. In this test a 1958 Hydra-Matic transmission, containing the fluid to be evaluated, is driven by a 1958 Super 88 Oldsmobile. The transmission is connected to a Mid-West 175 HP Dynamometer Model 1014, the latter being equipped with an inertia flywheel so that the total inertia of the dynamometer-flywheel system is 570 lbs.-ft.$^2$. The test consists of a maximum of either 50 or 100 hrs. of cycling operation, 50 hours if the fluid is intended for use by retail outlets such as service stations, etc., 100 hours if the fluid is intended for the initial fill by the automobile manufacturer. Each cycle is one minute long and consists of 23 seconds acceleration and 37 seconds deceleration. During the acceleration the throttle is set to balance a dynamometer load of 263 ft.-lbs. at 3600 r.p.m. During the deceleration the dynamometer load is set to 210–220 ft.-lb. at 3000 r.p.m. Throughout the test the transmission fluid sump temperature is maintained at 275±5° F. The test is run until 50 or 100 hours of cycling operation have elapsed, the exact number of hours being determined by the criteria mentioned above, or until the transmission fluid fails, whichever occurs first. Fluid failure is the time at which the transmission takes more than 10 seconds to shift into fourth gear after the acceleration portion of the cycle begins. A fluid passes the cycling test if no failure occurs in the 50 or 100 hours of cycling operation.

The composition adapted for transmission fluid use will normally contain a detergent in order to keep any foreign matter which develops in the fluid in suspension so that it will not cause undue wear.

The specific additives described above are some of those commonly used to render an oil adapted for use as an automatic transmission fluid. As those skilled in the art will appreciate, many other specific additives are also used. The present invention does not relate to the precise additives used to render the hydrocarbon oil adapted for use as an automatic transmission fluid. The present invention is a means of eliminating squawk in an oil based composition which is (1) adapted for such use and (2) which squawks.

The antisquawk additive of the invention has been described hereinbefore. The amount required to eliminate squawk will vary somewhat from one transmission fluid to another but will usually be about .01–1% although amounts as high as 2% or even 4% can be used if desired. All percentages herein are by weight and are based on the weight of the final fluid, i.e., the composition adapted for transmission fluid use plus the antisquawk additive. Preferably the amount employed is 0.1% to 0.8%. In all cases it should, of course, be used in an amount sufficient to eliminate squawk. The method of incorporating the antisquawk additive into the transmission fluid is discussed subsequently.

It was mentioned previously that in some cases the antisquawk additive imparts certain other beneficial properties to the transmission fluid. The benefits obtained in addition to squawk elimination are improved wear properties and improved oxidation resistance. These additional benefits are obtained when three criteria are met. One criterion is that the oil component of the fluid is a mineral oil. The second criterion is that the antisquawk additive is an alkaline earth salt of a carboxylic acid shown in Formula I. Preferably the metal is calcium or barium and the preferred forms of $R_1$, $R_2$, and $R_3$ are as previously described, i.e., the compound is preferably an N-acylsarcosinate. The third criterion is that the antisquawk additive is used in combination with another additive, a basic or overbased alkaline earth metal sulfonate.

Such metal sulfonates and their preparation have been known for many years in the art but can be briefly described as follows. The basic metal sulfonates are prepared by sulfonating an alkyl aromatic, usually a mixture of mono-, di-, and trialkyl aromatics, wherein the alkyl groups contain 8–20 carbon atoms, with $H_2SO_4$ and then neutralizing the resulting sulfonic acids with an alkaline earth metal base such as $Ca(OH)_2$, $CaCO_3$, $Ba(OH)_2$, $Mg(OH)_2$, etc., the amount of metal base being about one mole per mole of sulfonic acid so that each molecule of product theoretically contains one or slightly less than one OH group. The product is, e.g., calcium hydroxysulfonate or, as more commonly identified, basic calcium sulfonate. The alkyl aromatic starting material can be synthesized or can be obtained by fractional distillation of appropriate lube oil fractions. The basic metal sulfonate is normally used as an oil solution.

"Super" or overbased alkaline earth metal sulfonates can also be used for the present purpose in place of basic calcium sulfonate. They are obtained by reacting the sulfonic acid with an excess of metal base beyond that required to neutralize the sulfonic acid, i.e., more than one mole of metal base per mole of the sulfonic acid. The resulting product, e.g., overbased calcium sulfonate, has a higher alkali value than basic calcium sulfonate. It is not known in what form the excess metal base exists but most authorities agree that it is complexed in some manner with the basic calcium sulfonate.

As described, the preparation of basic or overbased alkaline earth metal sulfonates is well known in the art. See, for example, U.S. Patents 3,017,361; 3,105,940; 2,585,520; and the patents referred to therein.

The basic or overbased alkaline earth metal sulfonate and the squawk inhibitor can be incorporated into the oil in any of several ways. In the following discussion thereof it will be assumed that the metal component of the sulfonate is calcium and that the squawk inhibitor is a calcium N-acyl sarcosinate. One method involves merely adding the calcium N-acyl sarcosinate squawk inhibitor to the transmission fluid followed by addition of basic or overbased calcium sulfonate. The fluid is then thoroughly mixed to uniformly distribute these additives therein. Another method involves adding overbased calcium sulfonate and N-acyl sarcosine to the fluid followed by thorough mixing. During the mixing the N-acyl sarcosine reacts with the excess calcium base in the overbased sulfonate resulting in the formation of calcium N-acyl sarcosinate. Another and preferred procedure is to premix the N-acyl sarcosine and overbased calcium sulfonate and then add the reaction product to the transmission fluid. If the calcium N-acyl sarcosinate is preformed separately, i.e., not by reaction with overbased calcium sulfonate, the other additive can be either basic or overbased calcium sulfonate.

In order to obtain improved oxidation resistance and improved antiwear properties in the fluid, in addition to preventing squawk, the amount of the two additives should be as follows. The amount of calcium N-acyl sarcosinate should be 0.1–4%, preferably 0.1–0.8%, the percentages being based on the weight of the total composition, which is the composition adapted for transmission fluid use plus the N-acyl calcium sarcosinate plus the basic calcium sulfonate. It is thus apparent that while amounts of calcium N-acyl sarcosinate less than 0.1%, i.e., 0.01–0.1%, are sufficient to prevent squawk, the amount of sarcosinate that should be employed to obtain the additional benefits mention is at least 0.1%. The amount of basic calcium sulfonate employed should be such that the weight ratio of basic calcium sulfonate to antisquawk additive is at least 0.1:1, preferably at least 0.5:1. The maximum amount of basic calcium sulfonate which can be used is not critical but will normally not be more than 8% of the total composition, preferably not more than 6%. If an overbased calcium sulfonate is employed the excess metal is, of course, not counted in determining the amount of basic calcium sulfonate present in the final composition, but is counted in determining the total composition weight. In the appended claims the term basic calcium sulfonate includes both basic calcium sulfonate per se and also overbased calcium sulfonate.

It has already been mentioned that for the sole purpose of eliminating squawk the compounds defined by Formula I and the specified metal salts thereof are effective. In other words the use of basic calcium sulfonate is unnecessary. It will be found, however, that the alkaline earth metal salts of the acids of Formula I are often not as soluble in the composition adapted for transmission fluid use as the acids themselves are. Although the salts are sufficiently soluble to prevent squawk the dissolution of the salt is facilitated by the presence of basic calcium sulfonate in a sulfonate to salt ratio of about 0.1:1, preferably 0.5:1, more preferably 1:1.

The following examples illustrate the benefits which can be obtained in an automatic transmission fluid by employing the additives and additive combinations herein described. The squawk test used in the examples is as follows.

A 1964 Powerglide automatic transmission is mounted in a 1964 Chevrolet. The transmission fluid employed is, of course, the fluid being evaluated for squawk properties. The test consists of driving the car through a number of acceleration cycles on a level proving ground. In each cycle the throttle is first set to ⅓ full throttle and the engine is allowed to accelerate, at this constant throttle setting, until the shift from low to drive has occurred. When the shift has occurred the throttle is closed, the car stops, and the engine returns to idling speed. This procedure is then repeated except that the throttle is set to ½ full throttle rather than ⅓. The procedure is repeated twice more, once at ⅔ full throttle setting and once at full throttle setting. Thus each cycle consists of 4 accelerations with the engine returning to idle between each acceleration. The test is started with the transmission fluid below 100° F. During the course of the test the fluid temperature increases and when the temperature reaches 300° F., which usually represents 50–100 cycles, the test is stopped. During the test an attendant listens for squawk. Any squawk which occurs will occur during the shift from low to drive. The loudness of the squawk is indicated as light, medium, or heavy, these terms being listed in order of increasing loudness of the sqawk. A fluid which does not squawk up to 250° F. is very satisfactory.

EXAMPLE I

In this example a base hydrocarbon oil to which has been added a VI improver and an antifoam agent is subjected to the squawk test described above. The base oil is a blend of paraffinic and naphthenic oils and has, before addition of the additives, a viscosity at 210° F. of 40 S.U.S. and a VI of 60. The VI improver is Acryloid 710, the composition of which is described in U.S. Patent 3,017,361 and the antifoam agent is dimethyl silicone. The amounts of base oil and VI improver are 98 parts and 2 parts respectively, the amount of dimethyl silicone 5 parts per million parts of base oil.

In the squawk test squawk is first heard at ⅓ full throttle and 150° F. At higher temperatures and/or throttle settings the composition squawks.

EXAMPLE II

The procedure is the same as in Example I except that in addition to adding the VI improver and antifoam agent to the base oil oleoyl sarcosine is also added. The amount of oleoyl sarcosine added is 0.1 part. Thus the concentration of anti-squawk additive in the composition tested is 0.1%.

In the squawk test there is no squawk at all throttle settings up to and including 300° F.

EXAMPLE III

The procedure is the same as in Example II except that the antisquawk additive is the calcium salt of oleoyl sarcosine. This salt is prepared by reacting oleoyl sarcosine with NaOH to form the sodium salt of the acid and then reacting the later with calcium chloride in the ratio of 0.5 mole $CaCl_2$ per mole of the sodium salt. The amount of antisquawk agent used is 0.1%.

In the squawk test there is no squawk at all throttle settings up to and including 300° F.

EXAMPLE IV

Using 90 parts hydrocarbon oil and 10 parts of a commercialy available additive package a composition of prepared which passes all the tests described hereinbefore for determining the suitability of oil for automatic transmission fluid use. The hydrocarbon oil is a mixture of paraffinic and naphthenic oils and the additive package contains an antioxidant, a polymeric VI improver, an antiwear agent, a rust inhibitor, a detergent, and an antifoam agent. The additive package contains no metal sulfonate of any type.

The composition is subjected to the squawk test and the results are as follows. There is no squawk at all throttle settings up to and including 175° F. At 200° F. there is light squawk at all throttle settings. At 225° F. there is light squawk at ⅓ full throttle and medium squawk above ⅓ full throttle. At 260° F. there is medium to heavy squawk at all throttle settings.

EXAMPLE V

The procedure is the same as in Example IV except that oleoyl sarcosine is added to the composition, the amount of the antisquawk agent being 0.15% by weight of the resulting mixture.

In the squawk test there is no squawk at all throttle settings at all temperatures up to and including 300° F.

EXAMPLE VI

The procedure is the same as in Example IV except that there is added to the fluid a mixture prepared by mixing oleoyl sarcosine and overbased calcium sulfonate. The excess metal base in the overbased sulfonate is $CaCO_3$ and when the oleoyl sarcosine and overbased calcium sulfonate are mixed a reaction resulting in the formation of calcium oleoyl sarcosinate occurs. This reaction is evidenced by frothing of the mixture which is due to the liberation of $CO_2$. The resulting transmission fluid composition contains 0.15% calcium oleoyl sarcosinate and 0.15% basic calcium sulfonate.

A portion of the transmission fluid composition so prepared is subjected to the squawk test. The results are the same as in Example V.

EXAMPLE VII

In this example four compositions are subjected to the Shell Four Ball Wear Test (40 kg., 200° F., 600 r.p.m., 2 hours). The four compositions tested are as follows. The first composition is a typical fluid prepared as in Example IV. The second is a composition prepared as in Example IV plus calcium oleoyl sarcosinate, the amount of the latter being 0.3%; in other words, a typical transmission fluid plus calcium oleoyl sarcosinate. The third composition is a typical fluid prepared as in Example IV to which has been added basic calcium sulfonate, the amount of the latter being 0.3%. The fourth is another portion of the composition prepared in Example VI, i.e., a typical transmission fluid prepared as in Example VI plus basic calcium sulfonate plus calcium oleoyl sarcosinate, the amount of these two additives being 0.15% each. The results of the Shell Wear Test are as follows.

| Composition: | Scar diameter (mm.) |
|---|---|
| (1) Typical fluid | 0.55 |
| (2) Typical fluid+calcium oleoyl sarcosinate | 0.50 |
| (3) Typical fluid+basic calcium sulfonate | 0.56 |
| (4) Typical fluid+calcium oleoyl sarcosinate +basic calcium sulfonate | 0.36 |

The above data show that the additive combination improves the wear properties of the fluid and is distinctly superior to either additive alone in this respect.

EXAMPLE VIII

In this example the effect of the additives employed in Example VII on the oxidation stability of the fluid is determined. The test used to determine oxidation stability is as follows. A bronze thrust washer from a 1963 Powerglide automatic transmission is placed in a beaker. Next 200 grams of the composition being evaluated are placed in the beaker. This completely submerges the washer. The beaker is placed in an oven at 300° F. and atmospheric pressure and while in the oven the composition is stirred at 600 r.p.m. with a laboratory stirrer. After being in the oven for 200 hours the composition is removed from the beaker and 1 ml. of the composition is filtered through a ½ inch disc of Whatman No. 1 filter paper. The ½ inch disc is then stapled to a piece of blotter paper and allowed to dry. The oil in the disc is absorbed by the blotter paper leaving only any contaminants which were in the fluid on the disc. The color of the filter paper after filtration of the composition is a measure of the oxidation stability thereof, the darker the color the poorer the stability.

The four compositions tested in Example VII are subjected to the above oxidation test. In addition, the typical fluid is also filtered without being subjected to the above test. The results of the tests are as follows:

| Composition | Color of filter paper |
|---|---|
| Unoxidized: | |
| (1) Typical fluid | White. |
| Oxidized: | |
| (2) Typical fluid | Dark brown. |
| (3) Typical fluid+calcium oleoyl sarcosinate | Dark brown. |
| (4) Typical fluid+basic calcium sulfonate | Dark brown. |
| (5) Typical fluid+calcium oleoyl sarcosinate+basic calcium sulfonate | Tan to light tan. |

It is evident from the above that the combination of additives employed in composition 5 substantially improves the oxidation stability of the fluid and that this improvement is not obtained with either additive alone.

EXAMPLE IX

A composition adapted for transmission fluid use is prepared by adding to di-2-ethylhexyl sebacate an antioxidant, VI improver, detergent, antiwear agent, rust inhibitor, and an antifoam agent. The composition passes all the tests described hereinbefore for determining the suitability of an oil for automatic transmission fluid use.

The composition is subjected to the squawk test described hereinbefore and it is found that it squawks at ⅓ full throttle and 175° F. and at all temperatures and throttle settings above this.

EXAMPLE X

The procedure is the same as in Example IX except that 0.2 part oleoyl sarcosine is added to the composition. The results in the squawk test are the same as in Example V.

Substantially the same benefits as shown in the examples above are obtained when other additives of the type described herein are employed.

I claim:
1. A non-squawking automatic transmission fluid consisting essentially of a major amount of oil selected from the group consisting of mineral lubricating oils and synthetic lubricating oils and .01–4%, sufficient to prevent squawking of the composition, of an alkali metal salt of a carboxylic acid having the formula

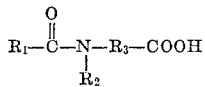

wherein $R_1$ is selected from the group consisting of alkyl groups and alkenyl groups, each containing 8–30 carbon atoms, $R_2$ is selected from the group consisting of hydrogen and alkyl groups containing 1–6 carbon atoms, and $R_3$ is an alkylene group containing 1–6 carbon atoms.

2. Composition according to claim 1 additionally characterized in that it has viscosities of at least 49.0 S.U.S. at 210° F. and not more than 4500 cp. at −10° F., a flash point of at least 320° F. by A.S.T.M. D–92, it passes the A.S.T.M. D–892 foam test, the A.S.T.M. D–130 flake test, the A.S.T.M. D–665, Procedure A, rust protection test, the Powerglide Oxidation and Thermal Stability Test, and the Transmission Cycling Test.

3. Composition according to claim 1 wherein $R_2$ is methyl and $R_3$ is methylene.

4. An automatic transmission fluid according to claim 1 wherein said oil is a mineral lubricating oil.

5. Method which comprises lubricating an automatic transmission with a non-squawking automatic transmission fluid as defined in claim 2.

References Cited
UNITED STATES PATENTS

| | | | |
|---|---|---|---|
| 2,779,784 | 1/1957 | Sharrah | 252—75 X |
| 3,156,652 | 11/1964 | Foehr | 252—75 |
| 3,017,361 | 1/1962 | Morris et al. | 252—35 |

LEON D. ROSDOL, *Primary Examiner.*

R. D. LOVERING, S. D. SCHWARTZ,
*Assistant Examiners.*